Patented Dec. 12, 1933

1,939,008

UNITED STATES PATENT OFFICE 1,939,008

FAST BLUE SULPHUR DYESTUFFS

Richard Herz, Frankfort-on-the-Main, and Wilhelm Hechtenberg, Mainkur, near Frankfort-on-the-Main, Germany, assignors to General Aniline Works, Inc., New York, N. Y., a corporation of Delaware No Drawing. Application February 7, 1928, Serial No. 252,670, and in Germany February 12, 1927

3 Claims. (Cl. 260—17)

Our present invention relates to new sulphur dyestuffs and to a process of preparing the same.

We have found that the quinone vat dyestuffs described in U. S. A. Patent No. 1,588,384 and obtainable by condensing arylaminoderivatives of ortho-aminoarylmercaptans with arylquinones which dyestuffs correspond probably to the following formula:

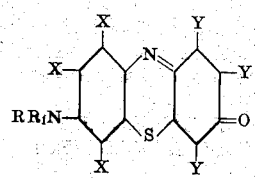

wherein $R_1$ denotes aryl, R hydrogen or alkyl or aralkyl, X hydrogen or a monovalent substituent, Y hydrogen or a monovalent substituent, especially halogen, yield valuable blue sulphur dyestuffs when treated in a suitable manner with sulphurizing agents. The process may be carried out e. g. by heating the quinone vat dyestuffs with alkali metal or ammonium sulphydrates, sulphides or polysulphides in an aqueous or alcoholic solution at atmospheric pressure on the reflux condenser or under elevated pressure in an autoclave. The new dyestuffs which contain in their molecule, as it has been ascertained, more sulphur than the starting materials, are when dry blue powders soluble in sulphuric acid with a blue color and dye cotton from a sodium sulphide bath or from the vat blue shades of an excellent fastness to washing and light, surpassing thereby the blue sulphur dyestuffs hitherto known.

In order to further illustrate our invention the following examples are given, the parts being by weight and all temperatures in centigrade degrees, but it may be understood that our invention is not limited to the particular products or reacting conditions mentioned therein.

Example 1

40 parts of the dyestuff described in the example of U. S. A. Patent No. 1,588,384 corresponding probably to the formula:

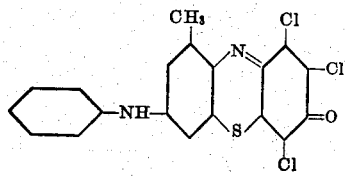

are introduced into a solution of about 250 parts of alcohol, 60 parts of anhydrous sodium sulphide and 30 parts of sulphur. The mass is heated in a vessel provided with a reflux condenser and a stirrer for about 20-40 hours. Then the 60 alcohol is distilled off the residue diluted with a common salt solution and the dyestuff precipitated is filtered, washed and dried. It dyes cotton from the sodium sulphide bath or from the vat clear blue shades of an excellent fastness to 65 washing and light.

In the same manner the process may be carried out with other usual sulphurizing agents.

Example 2

30 parts of the dyestuff corresponding probably to the formula:

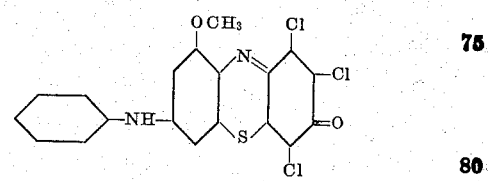

described in the example of the U. S. A. Patent No. 1,588,384 are introduced into a solution of 60 parts of crystallized sodium sulphide and 8 parts of sulphur in 250 parts of water. The mass is heated in a vessel provided with a reflux condenser and a stirrer for 20-25 hours. Then it is diluted with common salt solution. The dyestuff precipitated is filtered, washed and dried. It dyes cotton from a sodium sulphide bath or from the vat blue shades of an excellent fastness to washing and light.

Example 3

40 parts of the dyestuff corresponding probably to the formula:

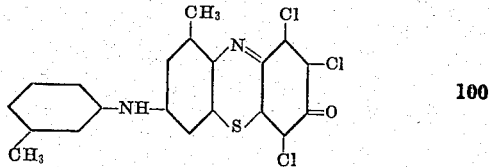

obtainable in an analogous manner as the above mentioned starting materials, are introduced into a mixture of 250 parts of an aqueous sodium sulphydrate solution of 40% and 250 parts of alcohol. The mass is heated in an autoclave at 120-130° for about 30 hours. Then the alcohol is distilled off, the residue is diluted with common salt solution. The dyestuff precipitated is filtered, washed and dried. It dyes cotton from a sodium sulphide bath or from the vat greenish blue shades of an excellent fastness to washing and light.

We claim:

1. A process which comprises acting with a sulphurizing agent of the group consisting of alkali metal and ammonium sulphydrates, sulphides and polysulphides on a quinone vat dyestuff corresponding probably to the general formula:

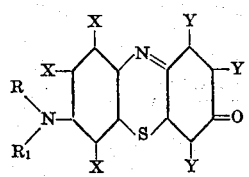

wherein $R_1$ denotes an aryl radical of the benzene series, R hydrogen or alkyl or an aralkyl radical of the benzyl series, X hydrogen or an alkyl or alkoxy group, Y hydrogen or halogen.

2. As new products sulphurized derivatives of thiazine compounds of the general formula:

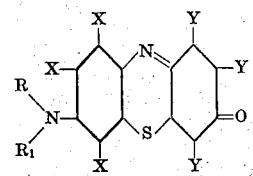

wherein $R_1$ denotes an aryl radical of the benzene series, R hydrogen or alkyl or an aralkyl radical of the benzyl series, X hydrogen or an alkyl or alkoxy group, Y hydrogen or halogen, which products are when dry blue powders, soluble in sulphuric acid with a blue color and dye cotton from the sodium sulphide bath or the vat blue shades of an excellent fastness to washing and light, which compounds are substantially identical with products obtainable by acting with a sulphurizing agent of the group consisting of alkali metal and ammonium sulphydrates, sulphides and polysulphides on quinone vat dyestuffs of the aforesaid general formula.

3. As a new product a sulphurized derivative of a thiazine compound of the formula:

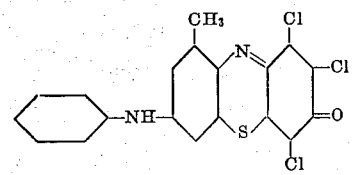

which is when dry a blue powder, soluble in sulphuric acid with a blue color and dyes cotton from a sodium sulphide bath or from the vat clear blue shades of an excellent fastness to washing and light, which compound is substantially identical with the product obtainable by acting with a sulphurizing agent of the group consisting of alkali metal and ammonium sulphydrates, sulphides and polysulphides on the quinone vat dyestuff of the aforesaid formula.

RICHARD HERZ.
WILHELM HECHTENBERG.